(12) United States Patent
May et al.

(10) Patent No.: US 9,764,528 B2
(45) Date of Patent: Sep. 19, 2017

(54) FULL DEPTH MANIFOLD SKIN WITH INTEGRATED SIDE TRIM FOR DOMESTIC KITCHEN APPLIANCE

(75) Inventors: George May, New Bern, NC (US); Michael Penuel, Swansboro, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 1078 days.

(21) Appl. No.: 13/192,672

(22) Filed: Jul. 28, 2011

(65) Prior Publication Data

US 2013/0026891 A1     Jan. 31, 2013

(51) Int. Cl.
     *A47B 43/00*     (2006.01)
     *A47B 97/00*     (2006.01)
     *B32B 1/04*      (2006.01)
     *A47B 96/20*     (2006.01)

(52) U.S. Cl.
     CPC .......... *B32B 1/04* (2013.01); *A47B 2096/208* (2013.01); *B32B 2509/00* (2013.01); *Y10T 428/239* (2015.01)

(58) Field of Classification Search
USPC ...... 312/204, 257.1, 265.5, 265.6, 263, 400, 312/401, 405, 409, 410, 402
See application file for complete search history.

(56) References Cited

U.S. PATENT DOCUMENTS

| | | | | |
|---|---|---|---|---|
| 1,355,213 A | * | 10/1920 | Chipperfield | 29/513 |
| 2,295,304 A | * | 9/1942 | Borman et al. | 52/261 |
| 2,319,403 A | * | 5/1943 | Hill | 49/463 |
| 2,434,811 A | * | 1/1948 | Rogers et al. | 126/39 B |
| 2,441,563 A | * | 5/1948 | Clark | 4/630 |
| 2,921,576 A | * | 1/1960 | Nolan | 126/273 A |
| 3,337,983 A | * | 8/1967 | Ebstein | 446/482 |
| 3,347,609 A | * | 10/1967 | Mann | 312/263 |
| 4,304,175 A | * | 12/1981 | Lang et al. | 454/204 |
| 4,479,737 A | * | 10/1984 | Bergh et al. | 403/382 |
| 4,618,193 A | * | 10/1986 | Cuthbert et al. | 312/264 |
| 4,935,593 A | * | 6/1990 | Nishikawa | 219/756 |
| 5,944,398 A | * | 8/1999 | Wu | 312/223.2 |
| 5,975,659 A | * | 11/1999 | Yang et al. | 312/223.2 |
| 6,099,095 A | * | 8/2000 | Irace | 312/257.1 |
| 6,561,180 B1 | * | 5/2003 | Austin et al. | 126/198 |

* cited by examiner

*Primary Examiner* — Daniel J Troy
*Assistant Examiner* — Timothy M Ayres
(74) *Attorney, Agent, or Firm* — Michael E. Tschupp; Andre Pallapies

(57) ABSTRACT

A manifold skin/side trim combination for a domestic kitchen appliance built into a cabinet is provided. The combination includes a manifold skin having a main skin body having a first surface and a second surface, and an opening in the first surface; and a side trim of the domestic kitchen appliance configured to be positioned adjacent to a front face of the cabinet, the side trim having a main section, an insertion extension that extends into the opening, and a transition section that connects the insertion extension to the main section such that the insertion section extends at an extension angle greater than zero degrees relative to the main section. An outside surface of the main section of the side trim is in the same plane as the second surface of the main skin body, and the second surface is adjacent to the first surface.

21 Claims, 4 Drawing Sheets

FULL DEPTH MANIFOLD SKIN WITH INTEGRATED SIDE TRIM FOR DOMESTIC KITCHEN APPLIANCE

FIELD OF THE INVENTION

The invention is directed to a trim feature for a domestic kitchen appliance.

An example of an application for the invention is the trim on a built-in domestic kitchen oven.

BACKGROUND OF THE INVENTION

Many domestic appliances, such as built in ovens, have a need for an esthetically pleasing trim that completes the boundary between the appliance and the cabinet in which the appliance is mounted.

Some built-in appliances have a manifold skin that covers a control section of the appliance. This manifold skin can have a lower surface that is adjacent to the door of the appliance and covers a lower side of the control section. Also, some type of side trim is usually needed to cover the edge of the opening of the cabinet in which the appliance is located. The location where the side trim meets the manifold skin presents a problem in that it is difficult to provide an esthetically pleasing transition between the side trim and the manifold skin. This is especially the case where the corners of the manifold skin are radiused.

SUMMARY

The invention recognizes that it is desirable to provide an esthetically pleasing yet simple detail at the location where the side trim meets the manifold skin.

Particular embodiments of the invention are directed to a manifold skin/side trim combination for a domestic kitchen appliance built into a cabinet. The combination includes a manifold skin configured to cover a control panel of the domestic kitchen appliance and a side trim of the domestic kitchen appliance. The manifold skin has a main skin body having a first surface and a second surface, and an opening in the first surface. The side trim is configured to be positioned adjacent to a front face of the cabinet and has a main section, an insertion extension that extends into the opening, and a transition section that connects the insertion extension to the main section such that the insertion section extends at an extension angle greater than zero degrees relative to the main section. An outside surface of the main section of the side trim is in the same plane as the second surface of the main skin body, and the second surface is adjacent to the first surface.

Other embodiments of the invention are directed to a domestic kitchen appliance configured to be built into a cabinet. The domestic kitchen appliance includes an appliance body; an operation space inside the appliance body; a door attached to the appliance body and enclosing the operational space; and a manifold skin/side trim combination. The manifold skin/side trim combination includes a manifold skin covering a control panel of the domestic kitchen appliance, the manifold skin having a main skin body having a first surface and a second surface, and an opening in the first surface; and a side trim of the domestic kitchen appliance configured to be positioned adjacent to a front face of the cabinet, the side trim having a main section, an insertion extension that extends into the opening, and a transition section that connects the insertion extension to the main section such that the insertion section extends at an extension angle greater than zero degrees relative to the main section. An outside surface of the main section of the side trim is in the same plane as the second surface of the main skin body, and the second surface is adjacent to the first surface.

Other embodiments of the invention are directed to a domestic kitchen appliance/cabinet combination. The combination includes a cabinet; an appliance body built into the cabinet; an operation space inside the appliance body; a door attached to the appliance body and enclosing the operational space; and a manifold skin/side trim combination. The manifold skin/side trim combination includes a manifold skin covering a control panel of the domestic kitchen appliance, the manifold skin having a main skin body having a first surface and a second surface, and an opening in the first surface; and a side trim of the domestic kitchen appliance positioned adjacent to a front face of the cabinet, the side trim having a main section, an insertion extension that extends into the opening, and a transition section that connects the insertion extension to the main section such that the insertion section extends at an extension angle greater than zero degrees relative to the main section. An outside surface of the main section of the side trim is in the same plane as the second surface of the main skin body, and the second surface is adjacent to the first surface.

BRIEF DESCRIPTION OF THE DRAWINGS

The following figures form part of the present specification and are included to further demonstrate certain aspects of the disclosed features and functions, and should not be used to limit or define the disclosed features and functions. Consequently, a more complete understanding of the exemplary embodiments and further features and advantages thereof may be acquired by referring to the following description taken in conjunction with the accompanying drawings, wherein.

DETAILED DESCRIPTION

The invention is described herein with reference to the accompanying drawings in which exemplary embodiments of the invention are shown. The invention may, however, be embodied in many different forms and should not be construed as limited to the embodiments set forth herein.

Figure 1:
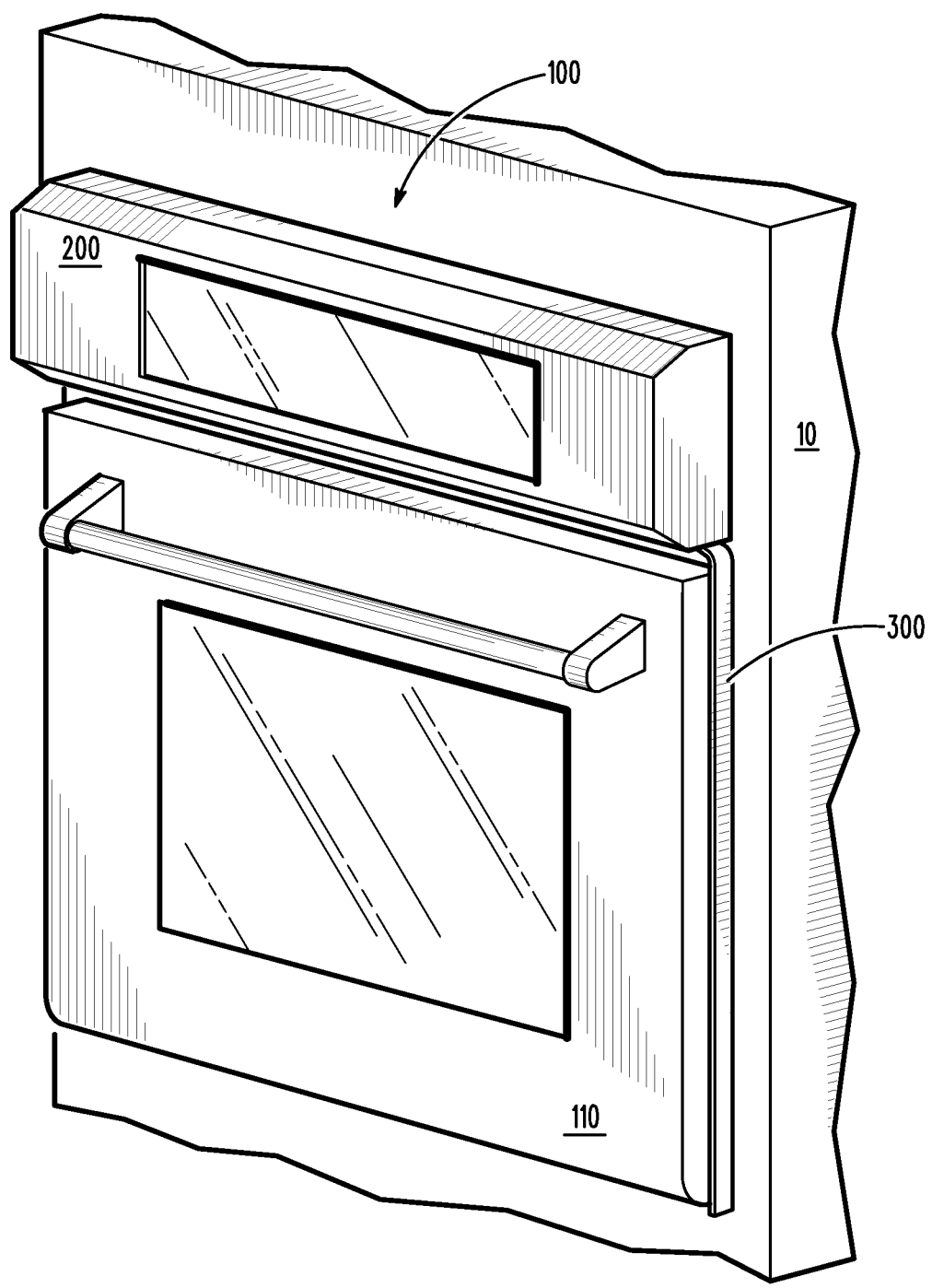
FIG. 1 is a perspective view of a domestic appliance in accordance with an exemplary embodiment of the invention.

FIG. 1 shows an example of a domestic kitchen appliance 100 such as, for example, an oven having a door 110. Domestic kitchen appliance 100 is, in this example, built into a cabinet 10. Cabinet 10 can be a piece of kitchen furniture made of wood or other material.

Figure 2:
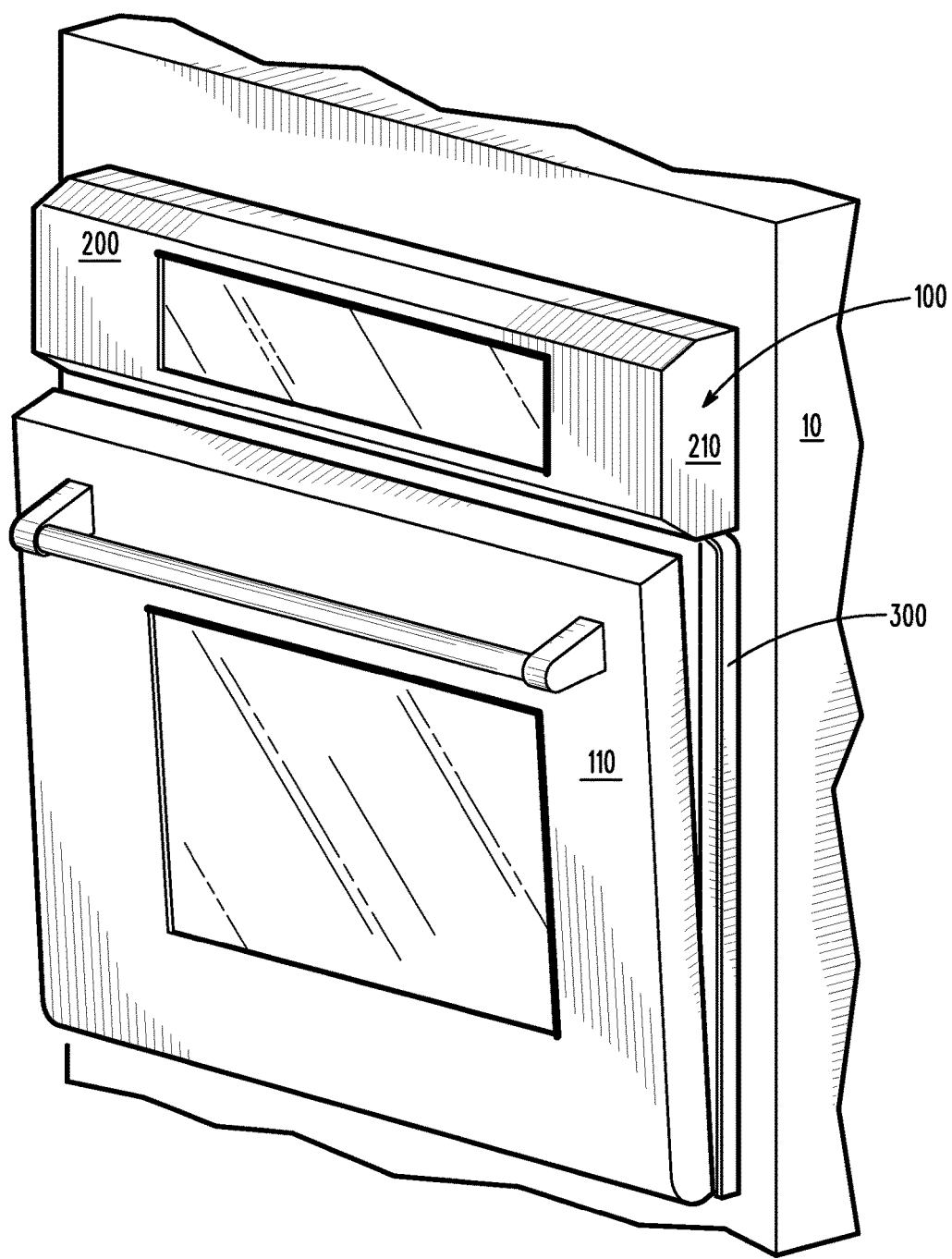
FIG. 2 is a partial perspective view of a domestic kitchen appliance in accordance with an exemplary embodiment of the invention.

FIG. 2 shows a partial view of a corner of domestic kitchen appliance 100 with its door 110 partially open. Domestic kitchen appliance 100 has a manifold assembly 200 that includes various controls and indicators for the operation of domestic kitchen appliance 100. Manifold assembly 200 can include, for example, a glass panel and/or knobs and buttons used by a user to interface with the controls.

The skin of manifold assembly 200 has a side surface 210 that, in this example, extends back and contacts a front face of cabinet 10. A side trim 300 continues along a side of the appliance adjacent to door 110 and the front face of cabinet 10. As stated above, the location where a manifold assembly and a side trim meet can present a problem because it can be difficult to provide an esthetically pleasing transition between a manifold assembly and aside trim. This is especially true in the case of a manifold skin that contacts a front face of a cabinet.

Figure 3:
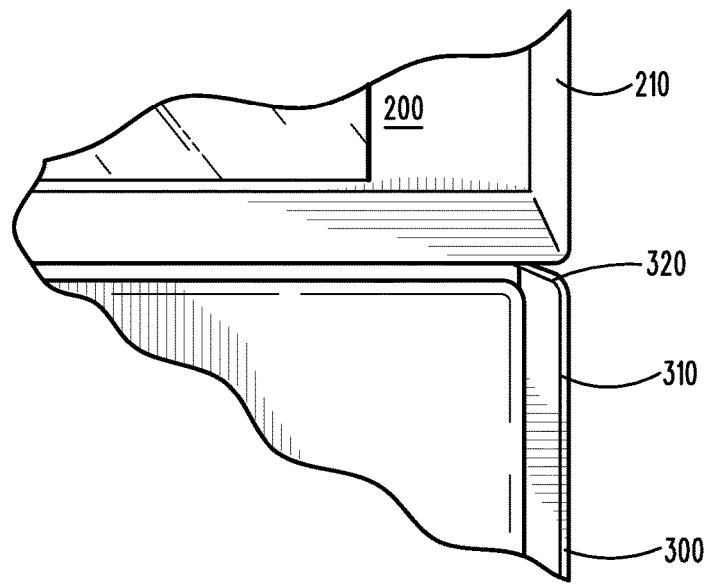
FIG. 3 is a partial perspective view of a domestic kitchen appliance in accordance with an exemplary embodiment of the invention.
Figure 4:
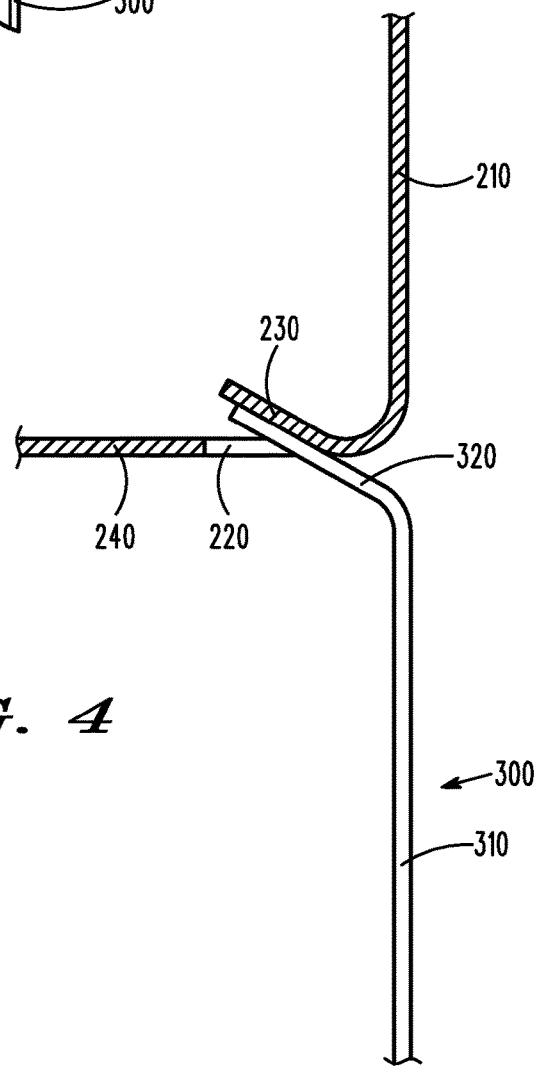
FIG. 4 is a partial sectional view of a portion of a manifold/side trim combination in accordance with an exemplary embodiment of the invention.

Embodiments of the invention provide a solution to this problem by providing an angled end of side trim 300. FIG. 3 shows side trim 300 having a main section 310 (that runs vertically in this example) and an insertion extension 320 that extends at an angle relative to main section 310. As shown in FIG. 4, insertion extension 320 extends into an opening 220 in a lower side 240 of the skin of manifold assembly 200. This detail hides the end of side trim 300 so that it cannot be seen by a user of the appliance and provides an esthetically pleasing solution to the above-described problem.

In the example shown in FIG. 4, opening 220 is formed by a portion of the lower side 240 being cut and then bent up into an interior space of manifold assembly 200. This results in the formation of a bent piece 230. In this example, insertion extension 320 contacts and runs parallel to bent piece 230. This avoids food or other foreign material from entering manifold assembly 200 from outside of side trim 300.

Figure 5:
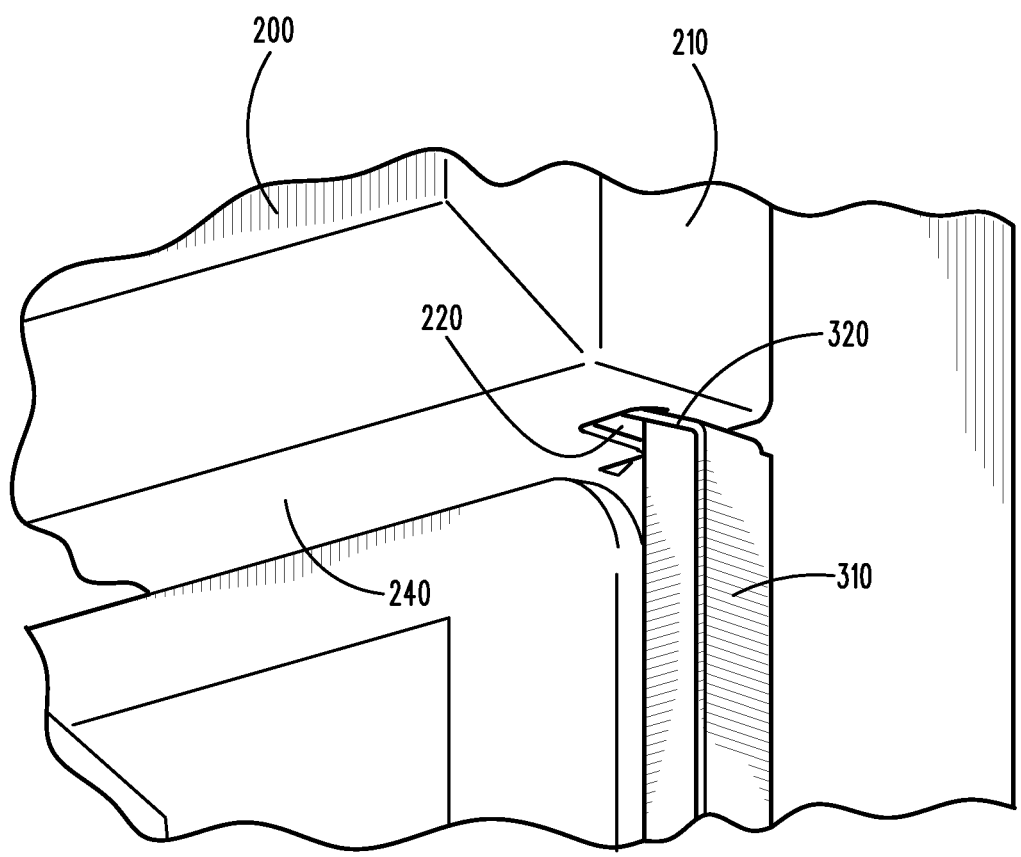
FIG. 5 is a partial perspective view of a domestic kitchen appliance in accordance with an exemplary embodiment of the invention.

FIG. 5 is a partial perspective view looking up at lower side 240 of the skin of manifold 200 and shows insertion extension 320 entering opening 220 at an angle. The angle between insertion extension 320 and main section 310 can be any angle that provides the desired appearance such as, for example, an angle between 15 degrees and 90 degrees. Another range of desirable angles is from 25 degrees to 45 degrees.

As shown in the examples in the figures, the combination of the radiused corner of the skin of manifold assembly 200 and the radiused transition between insertion extension 320 and main section 310 forms an esthetically pleasing designed gap in the collinear feature of the side surface 210 and side trim 300.

Although the above example is directed to a domestic kitchen oven, it is noted that the features of the invention can be applied to other domestic kitchen appliances such as, for example, microwave ovens and dishwashers.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the invention.

What is claimed is:

1. A manifold skin and trim combination for a domestic kitchen appliance built into a cabinet, the combination comprising:
    a manifold skin configured to cover a control panel of the domestic kitchen appliance, the manifold skin having
        a main skin body having a first surface and a second surface, and
        an opening in the first surface; and
    a side trim of the domestic kitchen appliance configured to be positioned adjacent to a front face of the cabinet, the side trim having
        a main section,
        an insertion extension that extends into the opening, and
        a transition section that connects the insertion extension to the main section such that the insertion extension extends at an extension angle greater than zero degrees relative to the main section,
    wherein an outside surface of the main section of the side trim is in the same plane as the second surface of the main skin body, and
    the second surface is adjacent to the first surface;
    wherein the main skin body has a flap adjacent to the opening that extends into an interior area of the main skin body, and the flap is parallel to the insertion extension of the side trim.

2. The combination of claim 1, wherein the extension angle is greater than 15 degrees and less than 90 degrees.

3. The combination of claim 2, wherein the extension angle is greater than 25 degrees and less than 45 degrees.

4. The combination of claim 3, wherein the main skin body is configured to contact the front face of the cabinet.

5. The combination of claim 1, wherein the second surface is connected to the first surface by a radiused section.

6. The combination of claim 5, wherein the insertion extension contacts the flap in the interior area of the main body.

7. A domestic kitchen appliance configured to be built into a cabinet, the domestic kitchen appliance comprising:
    an appliance body;
    an operation space inside the appliance body;
    a door attached to the appliance body and enclosing the operational space;
    a manifold skin/side trim combination having
        a manifold skin covering a control panel of the domestic kitchen appliance, the manifold skin having
            a main skin body having a first surface and a second surface, and
            an opening in the first surface; and
        a side trim of the domestic kitchen appliance configured to be positioned adjacent to a front face of the cabinet, the side trim having
            a main section,
            an insertion extension that extends into the opening, and
            a transition section that connects the insertion extension to the main section such that the insertion extension extends at an extension angle greater than zero degrees relative to the main section,
        wherein an outside surface of the main section of the side trim is in the same plane as the second surface of the main skin body, and
        the second surface is adjacent to the first surface;
        wherein the main skin body has a flap adjacent to the opening that extends into an interior area of the main skin body, and the flap is parallel to the insertion extension of the side trim.

8. The domestic kitchen appliance of claim 7, wherein the extension angle is greater than 15 degrees and less than 90 degrees.

9. The domestic kitchen appliance of claim 8, wherein the extension angle is greater than 25 degrees and less than 45 degrees.

10. The domestic kitchen appliance of claim 9, wherein the main skin body is configured to contact the front face of the cabinet.

11. The domestic kitchen appliance of claim 7, wherein the second surface is connected to the first surface by a radiused section.

12. The domestic kitchen appliance of claim 11, wherein the insertion extension contacts the flap in the interior area of the main body.

13. The domestic kitchen appliance of claim 7, wherein the insertion extension is the only part of the side trim that extends into the opening.

14. The combination of claim 7, wherein the insertion extension is the only part of the side trim that extends into the opening.

15. A domestic kitchen appliance and cabinet combination, the combination comprising:
- a cabinet;
- an appliance body built into the cabinet;
- an operation space inside the appliance body;
- a door attached to the appliance body and enclosing the operational space;
- a manifold skin/side trim combination having
  - a manifold skin covering a control panel of the domestic kitchen appliance, the manifold skin having
    - a main skin body having a first surface and a second surface, and
    - an opening in the first surface; and
  - a side trim of the domestic kitchen appliance positioned adjacent to a front face of the cabinet, the side trim having
    - a main section,
    - an insertion extension that extends into the opening, and
    - a transition section that connects the insertion extension to the main section such that the insertion extension extends at an extension angle greater than zero degrees relative to the main section,
  - wherein an outside surface of the main section of the side trim is in the same plane as the second surface of the main skin body, and
  - the second surface is adjacent to the first surface;
  - wherein the main skin body has a flap adjacent to the opening that extends into an interior area of the main skin body, and the flap is parallel to the insertion extension of the side trim.

16. The combination of claim 15, wherein the extension angle is greater than 15 degrees and less than 90 degrees.

17. The combination of claim 16, wherein the extension angle is greater than 25 degrees and less than 45 degrees.

18. The combination of claim 17, wherein the main skin body contacts the front face of the cabinet.

19. The combination of claim 15, wherein the second surface is connected to the first surface by a radiused section.

20. The combination of claim 19, wherein the insertion extension contacts the flap in the interior area of the main body.

21. The combination of claim 15, wherein the insertion extension is the only part of the side trim that extends into the opening.

* * * * *